United States Patent
Landrevie et al.

(10) Patent No.: US 10,309,854 B2
(45) Date of Patent: Jun. 4, 2019

(54) METHOD FOR PROCESSING A SIGNAL OF A PRESSURE MEASURING DEVICE INSIDE AN INTERNAL COMBUSTION ENGINE

(71) Applicants: CONTINENTAL AUTOMOTIVE FRANCE, Toulouse (FR); CONTINENTAL AUTOMOTIVE GMBH, Hannover (DE)

(72) Inventors: Laurent Landrevie, Villeneuve Tolosane (FR); Fabrice Tonon, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 611 days.

(21) Appl. No.: 14/427,807

(22) PCT Filed: Aug. 26, 2013

(86) PCT No.: PCT/EP2013/002564
§ 371 (c)(1),
(2) Date: Mar. 12, 2015

(87) PCT Pub. No.: WO2014/044352
PCT Pub. Date: Mar. 27, 2014

(65) Prior Publication Data
US 2015/0226626 A1     Aug. 13, 2015

(30) Foreign Application Priority Data
Sep. 20, 2012 (FR) .................. 12 58828

(51) Int. Cl.
G01L 23/08 (2006.01)
G01L 23/10 (2006.01)
(Continued)

(52) U.S. Cl.
CPC .............. G01L 23/10 (2013.01); G01L 23/08 (2013.01); G01L 23/226 (2013.01); G01L 23/227 (2013.01); G01M 15/08 (2013.01)

(58) Field of Classification Search
CPC ....... G01L 23/08; G01L 23/10; G01L 23/226; G01L 23/227
(Continued)

(56) References Cited

U.S. PATENT DOCUMENTS

2005/0199049 A1  9/2005  Okubo et al.
2005/0261821 A1  11/2005 Abe et al.
(Continued)

FOREIGN PATENT DOCUMENTS

CN  1667256   9/2005
CN  1702310   11/2005
(Continued)

OTHER PUBLICATIONS

International Search Report, dated Oct. 11, 2013, from corresponding PCT application.

*Primary Examiner* — An H Do
(74) *Attorney, Agent, or Firm* — Young & Thompson

(57) ABSTRACT

A method for processing a signal of a pressure measuring device inside an internal combustion engine, the device including: a pressure measuring sensor supplying an output voltage signal ($S_B$), and a processing unit connected to the pressure measuring sensor, the method including the following steps:

I. calculating a duration (Dt1) between a first time (t0) corresponding to a first combustion pressure peak (P0) and a second time (t1) corresponding to a second combustion pressure peak (P1), consecutive to the first combustion pressure peak (P0), II. calculating a correction start time ($t_{c1}$) defined according to the previously calculated duration (Dt1), (Continued)

III. measuring a value of the signal ($V_{OFF1}$) at the correction start time ($t_{c1}$),
IV. correcting the signal, on the basis of the correction start time ($t_{c1}$) in relation to a reference value ($V_{REF}$) and obtaining a first processed signal (S) such that:

$$S = S_B - V_{OFF1} + V_{REF}.$$

13 Claims, 3 Drawing Sheets

(51) Int. Cl.
     *G01L 23/22*     (2006.01)
     *G01M 15/08*     (2006.01)

(58) Field of Classification Search
     USPC .......................................... 702/33, 41, 44, 50
     See application file for complete search history.

(56) References Cited

U.S. PATENT DOCUMENTS

| | | |
|---|---|---|
| 2006/0000264 A1 | 1/2006 | Kim |
| 2011/0264392 A1 | 10/2011 | Ramond et al. |
| 2012/0060595 A1 | 3/2012 | Guwang et al. |

FOREIGN PATENT DOCUMENTS

| | | |
|---|---|---|
| CN | 1715859 | 1/2006 |
| EP | 1 574 834 A1 | 9/2005 |
| FR | 2 938 645 A1 | 5/2010 |

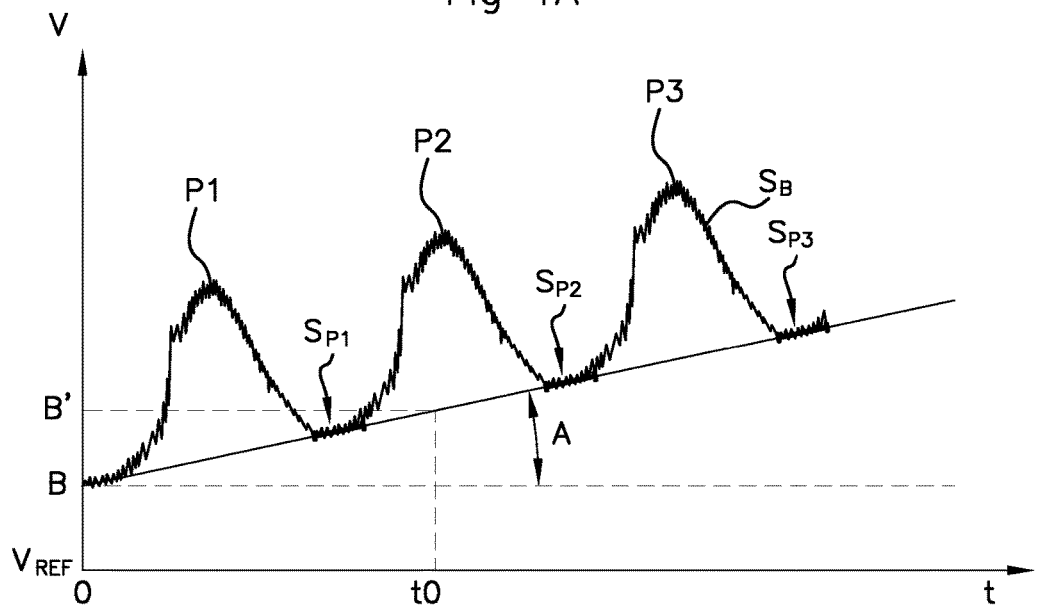
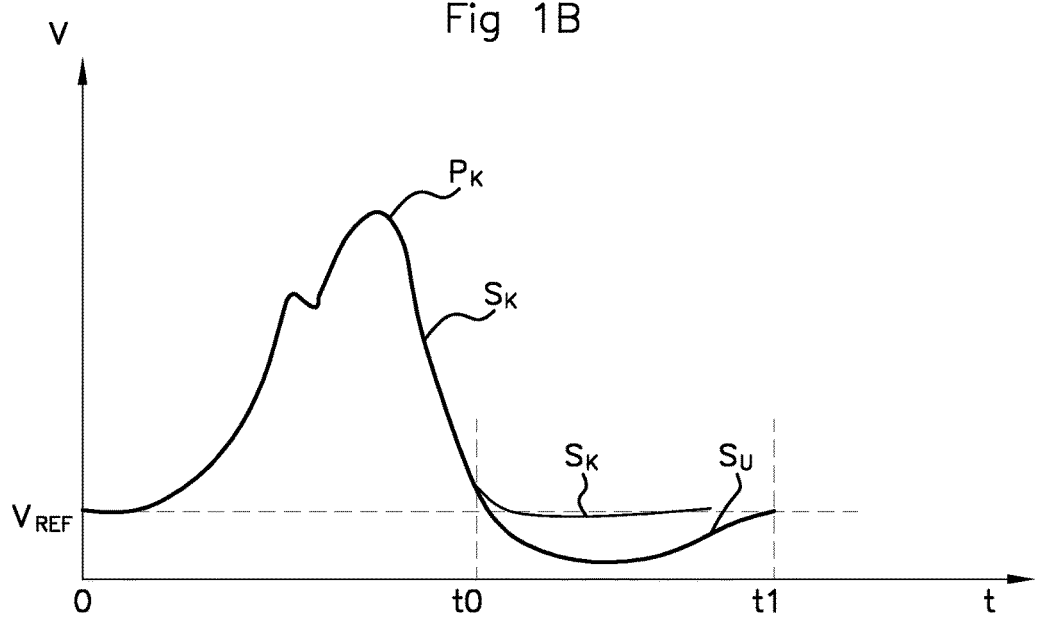

METHOD FOR PROCESSING A SIGNAL OF A PRESSURE MEASURING DEVICE INSIDE AN INTERNAL COMBUSTION ENGINE

BACKGROUND OF THE INVENTION

Field of the Invention

The invention relates to a method for processing a signal of a pressure measuring device inside an internal combustion engine.

Description of the Related Art

An internal combustion engine conventionally comprises cylinders in which pistons slide, each defining a combustion chamber in which fuel and an oxidizer are introduced in order to carry out the combustion of the mixture. The engine transforms the energy released by this combustion into mechanical energy.

It is known to equip internal combustion engines with pressure measuring devices including pressure measuring sensors and associated electronics, measuring the pressure inside the combustion chambers of the cylinders. The value of this pressure enables an electronic computing system (or ECU: "Engine Control Unit"), installed on-board a motor vehicle equipped with an internal combustion engine of this type to adjust in an optimum manner the parameters for regulating said engine, such as the fuel injection parameters or pollutant emission after-treatment parameters.

Pressure measuring sensors of this type may be piezoelectric sensors which, through variations in the electrical charges of the sensitive piezoelectric element subjected to a pressure, provide, in a relative manner, an indication of the pressure prevailing in the cylinder. The pressure measuring sensor then supplies a voltage representing these pressure variations. Generally, the voltage signal supplied by this type of pressure measuring sensor should more or less have the shape of a straight line with a value that is constant (for example y=0 volts), and repeatable, on which voltage peaks are periodically interleaved, representing the pressure peaks which occur within the combustion chamber of the cylinder during the compression and combustion phases in the combustion chamber of the cylinder.

However, this voltage signal is subjected to noise and drift due, inter alia, to the phenomena of pyroelectricity and/or vibrations to which said pressure measuring sensor is subjected. The signal delivered by the pressure measuring sensor is therefore different from the real curve of the pressure prevailing within the combustion chamber of the cylinder. Outside the pressure peaks, it does not have the shape of a straight line having a value that is constant and repeatable but, on the contrary, it more or less has the shape of straight line having a slope (i.e. the values of which drift in time) creating a drift or offset in relation to a reference value. This is shown in FIG. 1A. The pressure signal $S_B$ according to the time unit t is noisy and drifts according to a straight line having a slope A, thus creating a drift or offset in relation to a reference value $V_{REF}$ which changes according to the temps t, with a value B at t=0 and a value B' at t0 (cf. FIG. 1A). The signal $S_B$ can therefore be equated to an alternation of "plateau" phases $S_{P1}$, $S_{P2}$, $S_{P3}$, during which the voltage is offset in relation to a reference value $V_{REF}$ and changes according to a function with a slope A more or less linear as a function of time, and voltage peaks P1, P2, P3 representing the combustion pressure peaks.

In order for the pressure signal supplied by pressure measuring sensors of this type to be usable, a processing of the signal is therefore necessary. Here, the pressure measuring device includes a filter and an algorithm intended to eliminate this drift, also referred to as an offset correction algorithm, which are applied to the voltage signal. The filter eliminates the noise of the signal and the offset correction algorithm re-centers the reference value of the pressure, outside the pressure peaks, at a constant and repeatable reference value $V_{REF}$. This filter and this offset correction algorithm are integrated into a processing unit forming part of the pressure measuring device and located in a dedicated integrated circuit or "ASIC" ("Application Specific Integrated Circuit") associated with and connected to the pressure measuring sensor. The filter and the offset correction enable the value of the pressure within the combustion chamber of the cylinder to be determined in a precise manner on the basis of the signal processed in this way, and therefore the parameters for regulating the operation of the internal combustion engine to be adjusted proportionally.

A method of this type is known from the prior art. For example, it is known to use a Kalman filter based on a recursive error correction method between a signal and its prediction attenuated by a gain. The signal prediction is then calculated on the basis of the signal which is filtered and corrected at the preceding measurement time. More particularly and according to the document FR 2 938 645 A1, it is known to use two Kalman filters: a "fast" Kalman filter, i.e. comprising high-value slope and constant gains for the points belonging to the pressure peaks, and a "slow" Kalman filter, i.e. comprising low-value slope and constant gains for determining the signal drift, i.e. the offset during the plateau phases. The method described in FR 2 938 645 A1 then corrects each point according to whether or not it belongs to the pressure peaks detected according to the fast Kalman filter and according to the offset value determined according to the slow Kalman filter. However, the disadvantages of a signal processing method of this type are as follows:

- since each point of the signal is processed by a complex calculation using a Kalman filter, a signal processing method of this type is unwieldy and uses a substantial amount of the ASIC memory,
- this method is difficult to calibrate, since it comprises four variables to be parameterized: one slope and constant gain for the fast Kalman filter and a different slope gain and a different constant gain for the slow Kalman filter,
- at an engine speed below 1000 rpm, the processed signal resulting from this processing method is significantly deformed and therefore difficult to use.

This is shown in FIG. 1B. The pressure signal $S_K$ processed according to the signal processing method described in FR 2 938 645 A1 has a constant pressure reference value of $V_{REF}$, and no longer drifts in the time t. However, after the pressure peak $P_K$, between the times t0 and t1, this signal processing method creates an underestimation $S_u$ of the value of the pressure prevailing in the cylinder in relation to the real curve $S_R$.

SUMMARY OF THE INVENTION

The invention therefore proposes to overcome these disadvantages and proposes a signal processing method which corrects the offset of the signal without causing any deformation in the processed signal, simple to carry out and to calibrate and requiring a reduced memory size compared with the method of the prior art.

The invention proposes a method for processing a signal of a pressure measuring device inside an internal combustion engine, said device including:

a pressure measuring sensor supplying an output voltage signal representing the pressure within the internal combustion engine, the signal including "plateau" phases during which the voltage changes according to a more or less linear function as a function of time, and voltage peak phases representing the combustion pressure peaks, a processing unit connected to said pressure measuring sensor.

According to a first embodiment, the method includes the following steps:

I. Acquisition of the values of the pressure signal by the processing unit,

II. Detection by the processing unit of the voltage peaks of the signal representing the combustion pressure peaks.

The method is characterized in that it furthermore includes the following steps:

III. Calculation by the processing unit of a first duration between a first time corresponding to a first combustion pressure peak and a second time corresponding to a second combustion pressure peak, consecutive to the first combustion pressure peak, IV. Calculation by the processing unit of a correction start time defined by:

$$t_{c1} = t1 + x1*Dt$$

Where:
$t_{c1}$ is the correction start time,
t1 is a second time corresponding to a second combustion pressure peak,
Dt1 is a first duration between a first time (t0) corresponding to a first combustion pressure peak (P0) and a second time (t1) corresponding to a second combustion pressure peak (P1),
$t_{c2}$ is the correction end time,
and x1 is a first constant with a value varying between 0.1 and 0.9.

V. Measurement by the processing unit of a value of the signal at the correction start time, VI. Correction by the processing unit of the signal, on the basis of the correction start time in relation to a reference value, and obtaining of a first processed signal such that:

$$S = S_B - V_{OFF1} + V_{REF}$$

Where $S_B$ is the signal at the pressure measuring sensor output,
$V_{OFF1}$ is the value of the signal at the correction start time ($t_{c1}$),
$V_{REF}$ is the reference value.

According to a second embodiment, steps I to VI are repeated, and:

during step III: calculation by the processing unit of a second duration between the second time corresponding to the second combustion pressure peak and a third time corresponding to a third combustion pressure peak, consecutive to the second combustion pressure peak, during step IV: calculation by the processing unit of a second correction start time defined by:

$$t_{c2} = t2 + x2*Dt2$$

Where:
$t_{c2}$ is the second correction start time,
t2 is a third time corresponding to a third combustion pressure peak,
Dt2 is a second duration between the second time and the third time,
and x2 is a second constant with a value varying between 0.1 and 0.9.

during step V: measurement by the processing unit of a second value of the signal at the second correction start time, and calculation by the processing unit of a slope, defined by:

$$A = \frac{(V_{OFF2} - V_{OFF1})}{(t_{c2} - t_{c1})}$$

Where $V_{OFF2}$ is the value of the signal at the second correction start time,
$t_{c2}$ is the second correction start time, during step VI: correction of the signal by the processing unit, at a given time i, located after the second correction start time and obtaining of a second processed signal such that:

$$S'(t) = S(t) - A*t$$

Where S'(i) is the second processed signal at the time t,
S (i) is the first processed signal at the time t, In a different embodiment, the value of the second constant x2 is equal to the value of the first constant x1.

In one preferred embodiment of the processing method according to the invention:

step II consists in the second-order offset of the values of the signal in relation to a time unit, and the obtaining of an offset signal, such that:

$$S_D = \frac{dS_B^2}{dt^2}$$

where $S_D$ is the offset signal,
step III consists in:
the detection by the processing unit of two consecutive times, a first time and a second time corresponding to the passage of the values of the offset signal below a threshold,
the calculation by the processing unit of the duration between the first time and the second time.

The value of the threshold is judiciously determined in such a way that, at the first time and at the second time, the value of the signal is more or less maximum.

The signal is advantageously a signal filtered and sampled in relation to the time.

The value of the first constant x1 is preferably determined at a maximum engine speed, for example 5000 rpm. Alternatively, the value of the first constant x1 is between 0.4 and 0.7.

BRIEF DESCRIPTION OF THE DRAWING FIGURES

Other characteristics and advantages of the invention will become apparent from a reading of the description which follows, given by way of a non-limiting example, and from an examination of the attached drawings, in which:

FIG. 1a, already explained above, shows the signal at the sensor output without the signal processing method, FIG. 1b, already explained above, shows the signal processed by the signal processing method from the prior art, FIG. 2 shows the first signal processed by the signal processing method according to the invention.

DETAILED DESCRIPTION OF THE INVENTION

Figure 4:
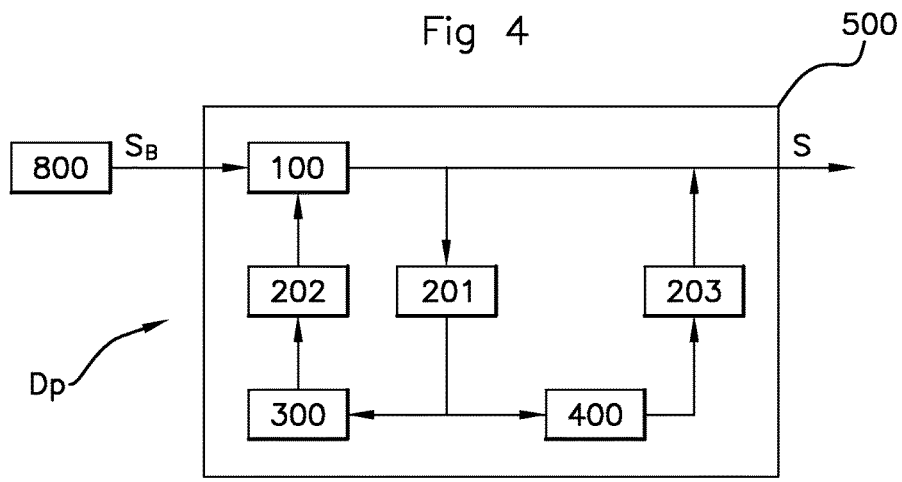
FIG. 4 is a schematic view showing the cylinder pressure measuring device according to the invention.

As shown in FIG. 4, the pressure measuring device $D_P$ according to the invention includes a pressure measuring sensor 800 connected to a processing unit 500.

As shown in FIG. 4, the signal $S_B$ at the output of the pressure measuring sensor 800 is acquired and processed by the processing unit 500 built into an integrated circuit (ASIC, not shown in FIG. 4) in order to deliver a processed signal S. This processing unit 500 generally includes:
a charge amplifier 100,
an analog/digital converter 201, connected to the charge amplifier 100 and connected
on the one hand, to:
filtering means 300 filtering the noise present on the signal $S_B$, connected to an digital/analog converter 202, itself connected to the charge amplifier 100. The filtering means 300 filter the noise present on the signal $S_B$ by adding or removing compensation charges to/from the input signal $S_B$ of the charge amplifier 100,
and, on the other hand, to:
signal processing means 400, generally including an offset correction algorithm, connected to a digital/analog converter 203, delivering a processed signal S to an electronic calculator (not shown).

This processing unit 500 is known to the person skilled in the art and will not be described in more detail here.

As previously explained, the signal $S_B$ from the pressure sensor 800 can be equated to an alternation of "plateau" phases $S_{P1}$, $S_{P2}$, $S_{P3}$ (cf. FIG. 1A) during which the voltage is offset in relation to a reference value $V_{REF}$ and changes according to a slope function A more or less linear as a function of time, and voltage peaks P1, P2, P3 representing the combustion pressure peaks (cf. FIG. 1A).

According to the prior art, the offset correction algorithm furthermore includes an algorithm for detecting voltage peaks representing the combustion pressure peaks.

This detection is necessary in order to distinguish the voltage values belonging to the plateau phases from the voltage values belonging to the combustion pressure peaks. In fact, the determination of the signal offset is possible only during the plateau phases, the abnormally high values of the combustion pressure peaks not allowing the determination of the offset.

This algorithm for detecting voltage peaks representing the combustion pressure peaks is based, for example, on the change in the slope of the signal from one measuring time t to the next t+1. Any abnormally and suddenly raised slope then indicates a start of a combustion pressure peak. Obviously, other signal voltage peak detection algorithms are possible and are known to the person skilled in the art, and will not be described in more detail here.

In order to improve this detection, it is known to prefilter the signal $S_B$ by using a low-pass filter in order to remove potential interference and noise. Is also known to sample it at a frequency lower than the signal acquisition frequency at the output of the sensor 800 by means of the processing unit 500. This sampling reduces the memory size of the ASIC dedicated to the method for processing the signal $S_B$. The filter and sampling can be implemented by the filtering means 300.

The invention proposes a method for processing the signal $S_B$ of the pressure measuring device $D_P$. This method takes the form of an algorithm which can be integrated, for example, and in a non-limiting manner, into the signal processing means 400 described above.

The method for processing the signal $S_B$ aims to correct the offset of the signal in relation to the reference value $V_{REF}$.

According to the invention, the values of the signal $S_B$ are first acquired by the processing unit 500 (step I) and the voltage peaks of the signal $S_B$ representing the combustion pressure peaks are detected (step II). As previously explained, these two steps are known from the prior art.

According to a first embodiment of the invention, the following step (step III) consists in calculating a first duration Dt1 between a first time t0 corresponding to a first combustion pressure peak P0 and a second time t1 corresponding to a second combustion pressure peak P1, consecutive to the first combustion pressure peak P0.

The invention then proposes to calculate (step IV) a correction start time $t_{c1}$, of the signal $S_B$, defined by:

$$t_{c1} = t1 + x1 * Dt1$$

Where x1 is a first constant with a value varying between 0.1 and 0.9.

The correction start time $t_{c1}$ is therefore located after the second combustion pressure peak P1. With an appropriate choice of the value of the first constant x1, the correction start time starts during a plateau phase of the signal $S_B$ before a third combustion peak P2 (cf. FIG. 2).

Thus, according to the invention, the first duration Dt1 calculated between two consecutive combustion pressure peaks, a first combustion pressure peak P0 and a second combustion pressure peak P1, is used in order to correct the signal $S_B$ following the second combustion pressure peak P1, independently of the change in the engine speed.

The invention is based on the following first hypothesis: the value of the engine speed is assumed to be more or less constant between three successive combustion pressure peaks (P0, P1, P2). Thus, the fundamental hypothesis of the invention consists in assuming that the value of the engine speed between the second combustion pressure peak P1 and the third combustion pressure peak P2 is equal to the value of the engine speed between the first combustion pressure peak P0 and the second combustion pressure peak P1. Consequently, the first duration Dt1 calculated between the two combustion pressure peaks (P0, P1) can therefore be used to estimate the duration between the second combustion pressure peak P1 and the following combustion pressure peak, i.e. the third combustion pressure peak P2. In other words, this enables identification of the plateau phase between these two combustion peaks, at the place where a correction is possible. This is explained below.

The invention therefore differs from the signal processing methods of the prior art, in which the instantaneous value of the engine speed was taken into account at each point of the signal during the correction of the signal $S_B$ at said point.

However, in reality, the first duration Dt1 between the pressure peaks (P0, P1) varies according to the engine speed. This first duration Dt1 is minimal for a maximum engine speed. The invention therefore judiciously proposes to set the value of the first constant x1 at a maximum engine speed in order to ensure that the correction start time $t_{c1}$ thus determined is in fact located in a plateau phase of the signal $S_B$ for any engine speed below the maximum speed, and that it is not located either in the end of the second combustion pressure peak P1, or in the start of the third combustion pressure peak P2. For example, according to one preferred embodiment, the invention proposes to set the value of the first constant x1 at between 0.4 and 0.7, or alternatively to set its value at an engine speed N with a maximum value N=5000 rpm.

During the following step, the invention proposes to measure the value of the signal $V_{OFF1}$ at the correction start time $t_{c1}$ (step V) and to correct the signal $S_B$ from the correction start time $t_{c1}$ in relation to a reference value $V_{REF}$ in order to obtain a first processed signal S such that:

$$S = S_B - V_{OFF1} + V_{REF}$$

the reference value $V_{REF}$ being able to be equal to zero.

The invention is therefore based on a second hypothesis, i.e. that the offset of the signal $S_B$ is largely due to thermal phenomena (pyroelectricity) with a relatively slow inertia. It is thus possible to use only a single signal value $V_{OFF1}$ measured at the correction start time tc1 and, on the basis of this value, to correct all the points of the signal $S_B$ located after the correction start time $t_{c1}$, regardless of whether they belong to a plateau phase or to a combustion peak.

It is therefore vital that the correction start time tc1 calculated in step IV is located in a plateau phase between two combustion pressure peaks, in order that the value of the signal $V_{OFF1}$ measured at the same time represents the offset of the signal $S_B$ and not a combustion pressure peak. This is why the value of the first constant x1 must be chosen judiciously (as previously explained), in order that the correction start time tc1 is still located in a plateau phase, regardless of the engine speed value.

Figure 2:
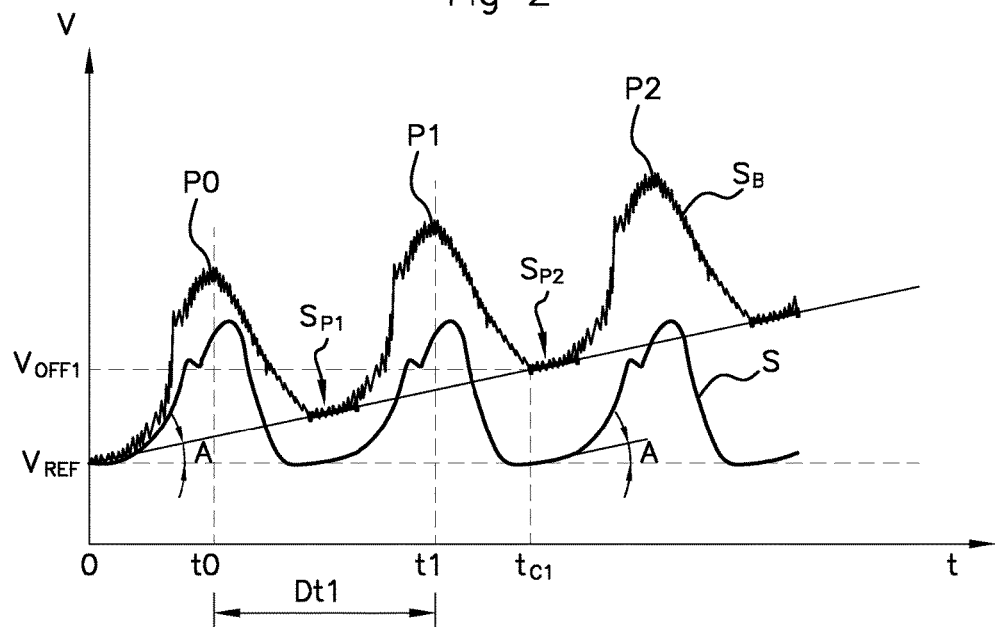

FIG. 2 shows, according to the time t, the processed signal S. This processed signal S as a whole no longer drifts. The slope of the signal as a whole is equal to zero. However, the corrected values, being located after the correction start time $t_{c1}$, change according to a linear function with a slope A.

Figure 3:
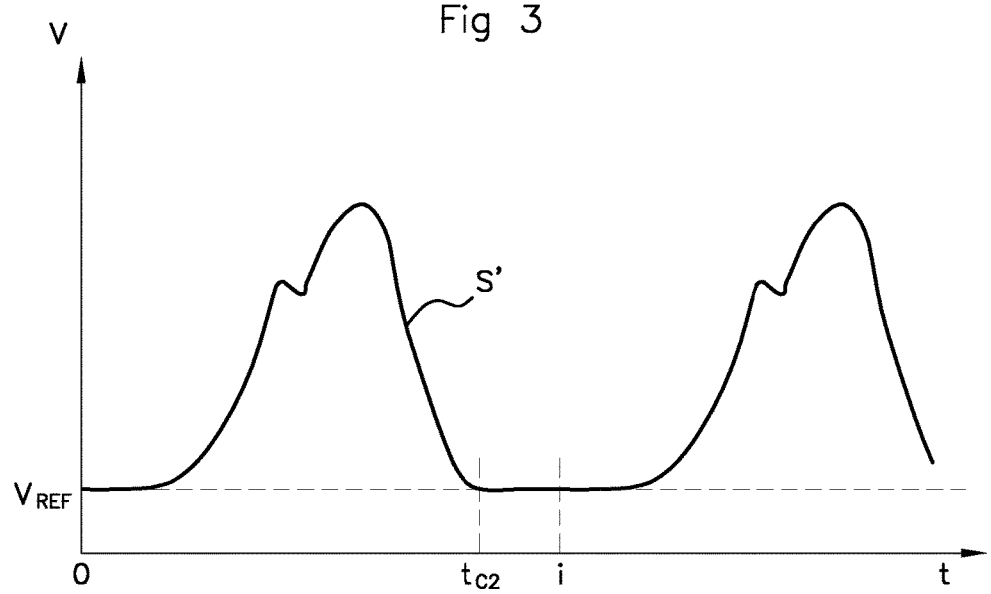
FIG. 3 shows the second signal processed by the signal processing method according to the invention.
Figure 5:
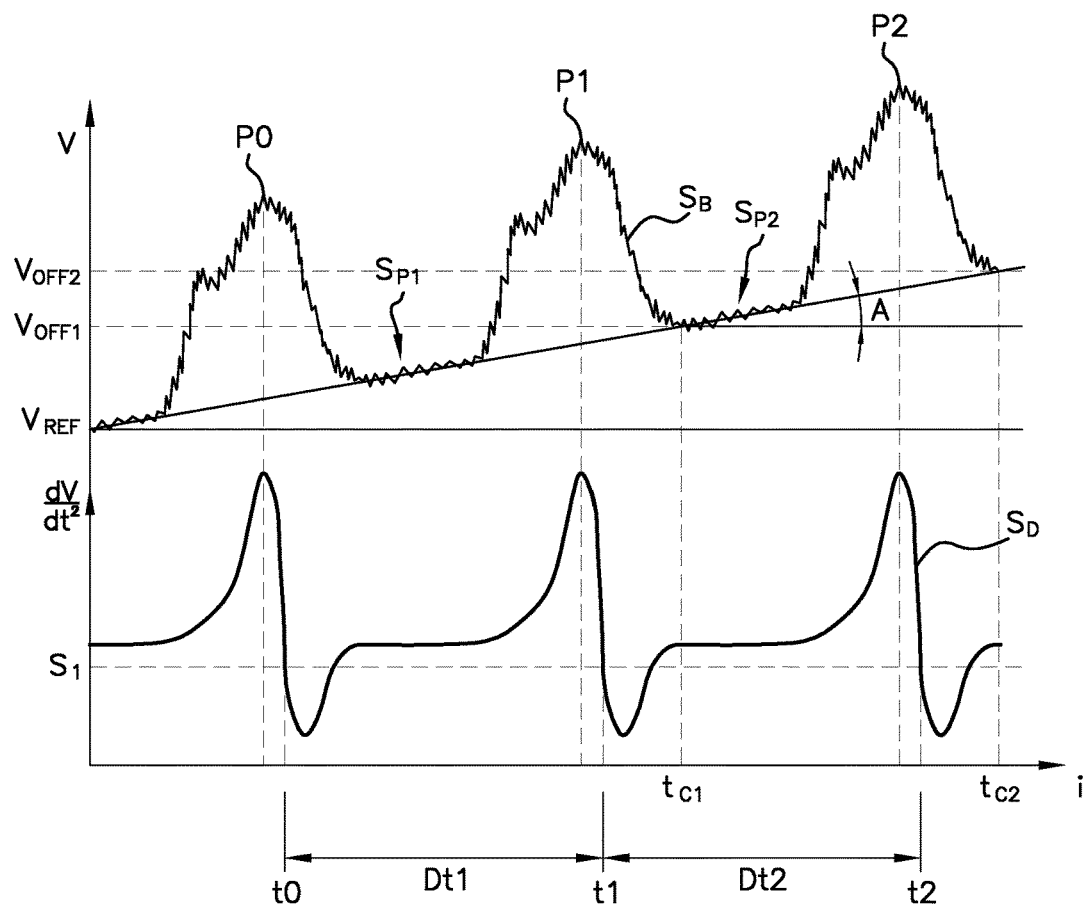
FIG. 5 shows, at the top of the figure, the signal at the output of the sensor, without the signal processing method, and, at the bottom of the figure, the signal in step III of the signal processing method according to one preferred embodiment of the invention.

In a second embodiment of the invention, this slope A is also corrected (cf. FIGS. 3 and 5).

In this second embodiment of the invention, steps I to IV are repeated between the second pressure peak P1 and the third pressure peak P2.

Thus:
during step III: the processing unit 500 calculates a second duration Dt2 between the second time t1 corresponding to the second combustion pressure peak P1 and a third time t2 corresponding to a third combustion pressure peak P2, consecutive to the second combustion pressure peak P1,
during step IV: the processing unit 500 calculates a second correction start time $t_{c2}$ defined by:

$$t_{c2} = t2 + x2 * Dt2$$

Where:
$t_{c2}$ is a second correction start time,
t2 is a third time corresponding to the third combustion pressure peak,
Dt2 is a second duration between the second time t1 and the third time t2,
and x2 is a second constant with a value varying between 0.1 and 0.9.
during step V: The processing unit 500 measures a second value of the signal $V_{OFF2}$ at the second correction start time $t_{c2}$, and calculates a slope A, defined by:

$$A = \frac{(V_{OFF2} - V_{OFF1})}{(t_{c2} - t_{c1})}$$

Where $V_{OFF2}$ is the value of the signal at the second correction start time $t_{c2}$,
$t_{c2}$ is a second correction start time,
during step VI: the signal $S_B$ is corrected by the processing unit 500, at a given time i, located after the second correction start time $t_{c2}$ in order to obtain a second processed signal S' such that:

$$S'(t) = S(t) - A*i$$

Where S'(i) is the second processed signal at the time i,
S (i) is the first processed signal at the time i.
The second correction start time tc2 is therefore located in the plateau phase after the third combustion pressure peak P2.

It will have been understood that the value of the slope A can only be calculated after the third combustion pressure peak P2, i.e. after two duration measurements (Dt1, Dt2). The calculation of the slope A is not possible from the second combustion pressure P1.

In one particular embodiment, the value of the second constant x2 is equal to the value of the first constant x1.

Similarly, for this second embodiment, it is assumed that the value of the slope A calculated between the second combustion pressure peak P1 and the third combustion pressure peak P2 is identical to the value between the third combustion pressure peak P2 and the following combustion pressure peak. As previously explained, this slope A is due to relatively slow thermal phenomena, and it is assumed that the slope does not change between two successive cycles. A cycle is defined by two consecutive combustion pressure peaks separated by a plateau phase.

Thus, the value of the slope A calculated between two consecutive pressure peaks (P1, P2), more precisely on the basis of the data over three consecutive cycles, is used to correct the signal $S_B$ located after the third pressure peak, according to the following equation:

$$S'(i) = S(i) - A*i$$

FIG. 3 shows, according to the time t, the second processed signal S'. The values of the signal $S_B$ during the plateau phases (after the second correction start time $t_{c2}$) have a constant and repeatable value at the reference value $V_{REF}$ and no longer change according to a linear function with a slope A. The determination of the slope A over three consecutive cycles therefore provides constant-value horizontal plateau phases.

In one preferred embodiment of the invention, the detection of the combustion pressure peaks (step II) and the calculation of the duration between two consecutive pressure peaks (step III) are carried out in the following manner:
step II consists in a second-order offset of the voltage values of the signal $S_B$ in relation to a time unit t, in order to obtain an offset signal $S_D$, i.e.:

$$S_D = \frac{dS_B^2}{dt^2}$$

step III consists in:
- the detection of two consecutive times, a first time t0, (or a second time t1 respectively) and a second time t1 (or third time t2 respectively) corresponding to the passage of the values of the offset signal $S_D$ below a threshold S1,
- the calculation of a duration (Dt1, Dt2) between the first time t0 and the second time t1 (or between the second time t1 and the third time t2 respectively).

This detection of the combustion pressure peaks also applies to the calculation of the second duration Dt2 between the second time t1 and the third time t2. FIG. 5 shows, according to the time t, the offset signal $S_D$, obtained in step II, and also the times t0, t1 of passage of the values of the offset signal $S_D$ below the threshold S1.

The threshold S1 is judiciously determined in such a way that, at the first time to, at the second time t1 and at the third time t2, the value of the signal $S_B$ is more or less maximum, but is located after the pressure peak. The times t0, t1, t2 thus correspond to times located immediately after combustion pressure peaks (P0, P1, P2). In fact, the threshold S1 must be set in such a way as to distinguish points located before a pressure peak from points located after a pressure peak. As shown in FIG. 5, the threshold S1 has a relatively low value and therefore enables detection of the points located immediately after a pressure peak.

The signal processing method according to the invention therefore provides a processed signal (S or S') representing the pressure prevailing in the combustion chamber of a cylinder, not involving, after the pressure peak, an underestimation of the value of the pressure prevailing in the cylinder, not entailing complex calculations requiring a substantial memory size in the ASIC associated with said sensor, as is the case for the prior art, and simple to carry out, since it suffices to calibrate once and for all the value of the constants x1 and x2.

The invention is obviously not limited to the embodiments described, given only as non-limiting examples.

The invention claimed is:

1. A method of measuring a pressure in a combustion chamber of a cylinder in a precise manner using a device for processing a signal of a pressure measuring device ($D_P$) inside an internal combustion engine, said device including:
   - a pressure measuring sensor (800) supplying an output voltage signal ($S_B$) representing the pressure within the internal combustion engine, the signal ($S_B$) including "plateau" phases during which the voltage changes according to a more or less linear function as a function of time, and voltage peak phases representing the combustion pressure peaks,
   - a processing unit (500) connected to said pressure measuring sensor,
   the method including the following steps:
   I) acquisition of the values of the signal ($S_B$) by the processing unit (500),
   II) detection by the processing unit (500) of the voltage peaks of the signal ($S_B$) representing the combustion pressure peaks,
   the method being characterized in that it furthermore includes the following steps:
   III) calculation by the processing unit (500) of a first duration (Dt1) between a first time (t0) corresponding to a first combustion pressure peak (P0) and a second time (t1) corresponding to a second combustion pressure peak (P1), consecutive to the first combustion pressure peak (P0),
   IV) calculation by the processing unit (500) of a correction start time ($t_{c1}$), located in a plateau phase between two combustion peaks, and defined by:

$$t_{c1}=t1\pm x1*Dt1$$

where:
   $t_{c1}$ is the correction start time,
   T1 is a second time corresponding to a second combustion pressure peak,
   Dt1 is a first duration between the first time (t0) and the second time (t1),
   x1 is a first constant with a value varying between 0.1 and 0.9,
   V) measurement by the processing unit (500) of a value of the signal ($V_{OFF1}$) at the correction start time ($t_{c1}$),
   VI) correction by the processing unit (500) of the signal ($S_B$), on the basis of the correction start time ($t_{c1}$) in relation to a reference value ($V_{REF}$) and obtaining of a first processed signal (S) such that:

$$S=S_B-V_{OFF1}+V_{REF}$$

Where $S_B$ is the signal at the pressure measuring sensor output,
   $V_{OFF1}$ is the value of the signal at the correction start time ($t_{c1}$),
   $V_{REF}$ is the reference value.

2. The method of measuring as claimed in claim 1, wherein:
   during step III: calculation by the processing unit (500) of a second duration (Dt2) between the second time (t1) corresponding to the second combustion pressure peak (P1) and a third time (t2) corresponding to a third combustion pressure peak (P2), consecutive to the second combustion pressure peak (P1),
   during step IV: calculation by the processing unit (500) of a second correction start time ($t_{c2}$) defined by:

$$t_{c2}=t2+x2*Dt2$$

Where:
   $t_{c2}$ is a second correction start time,
   t2 is a third time corresponding to a third combustion pressure peak,
   Dt2 is a second duration between the second time (t1) and the third time (t2),
   x2 is a second constant with a value varying between 0.1 and 0.9,
   during step V: measurement by the processing unit (500) of a second value of the signal ($V_{OFF2}$) at the second correction start time ($t_{c2}$), and calculation by the processing unit (500) of a slope (A), defined by:

$$A = \frac{(V_{OFF2} - V_{OFF1})}{(t_{c2} - t_{c1})}$$

Where $V_{OFF2}$ is the value of the signal at the second correction start time ($t_{c2}$),
   $t_{c2}$ is a second correction start time,
   during step VI: correction of the signal ($S_B$) by the processing unit (500), at a given time (i), located after the second correction start time ($t_{c2}$) and obtaining of a second processed signal (S') such that:

$$S'(i)=S(i)-A*i$$

Where S'(i) is the second processed signal at the time i, S (i) is the first processed signal at the time i.

3. The method of measuring as claimed in claim 2, wherein the value of the second constant x2 is equal to the value of the first constant x1.

4. The method of measuring as claimed in claim 3, wherein:
step II comprises the second-order offset of the values of the signal ($S_B$) in relation to a time unit (t), and obtaining of an offset signal ($S_D$), such that:

$$S_D = \frac{dS_B^2}{dt^2}$$

where $S_D$ is the offset signal,
step III comprises:
the detection by the processing unit (500) of two consecutive times [(t0, t1), (t1, t2)] corresponding to the passage of the values of the offset signal ($S_D$) below a threshold (S1),
the calculation by the processing unit (500) of a duration (Dt1, Dt2) between these two consecutive times [(t0, t1), (t1, t2)].

5. The method of measuring as claimed in claim 2, wherein:
step II comprises the second-order offset of the values of the signal ($S_B$) in relation to a time unit (t), and obtaining of an offset signal ($S_D$), such that:

$$S_D = \frac{dS_B^2}{dt^2}$$

where $S_D$ is the offset signal,
step III comprises:
the detection by the processing unit (500) of two consecutive times [(t0, t1), (t1, t2)] corresponding to the passage of the values of the offset signal ($S_D$) below a threshold (S1),
the calculation by the processing unit (500) of a duration (Dt1, Dt2) between these two consecutive times [(t0, t1), (t1, t2)].

6. The method of measuring as claimed in claim 2, wherein the signal ($S_B$) is a signal filtered and sampled in relation to the time.

7. The method of measuring as claimed in claim 2, wherein the value of the first constant x1 is determined at a maximum engine speed.

8. The method of measuring as claimed in claim 1, wherein:
step II comprises the second-order offset of the values of the signal ($S_B$) in relation to a time unit (t), and obtaining of an offset signal ($S_D$), such that:

$$S_D = \frac{dS_B^2}{dt^2}$$

where $S_D$ is the offset signal,
step III comprises:
the detection by the processing unit (500) of two consecutive times [(t0, t1), (t1, t2)] corresponding to the passage of the values of the offset signal ($S_D$) below a threshold (S1),
the calculation by the processing unit (500) of a duration (Dt1, Dt2) between these two consecutive times [(t0, t1), (t1, t2)].

9. The method of measuring as claimed in claim 8, wherein the value of the threshold (S1) is determined in such a way that, at the detected times (t0, t1, t2), the value of the signal (P0, P1, P2) is more or less maximum.

10. The method of measuring as claimed in claim 1, wherein the signal ($S_B$) is a signal filtered and sampled in relation to the time.

11. The method of measuring as claimed in claim 1, wherein the value of the first constant x1 is determined at a maximum engine speed.

12. The method of measuring as claimed in claim 11, wherein the maximum engine speed value is 5000 rpm.

13. The method of measuring as claimed in claim 1, wherein the value of the first constant x1 varies between 0.4 and 0.7.

* * * * *